(12) United States Patent
Ashraf

(10) Patent No.: US 8,819,606 B1
(45) Date of Patent: Aug. 26, 2014

(54) DESIGNING INTEGRATED CIRCUITS FOR HIGH THERMAL RELIABILITY

(71) Applicant: ARRIS Group, Inc., Suwanee, GA (US)

(72) Inventor: Tauheed Ashraf, Glendale, CA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 0 days.

(21) Appl. No.: 13/777,689

(22) Filed: Feb. 26, 2013

(51) Int. Cl.
*G06F 17/50* (2006.01)

(52) U.S. Cl.
CPC .................................. *G06F 17/5068* (2013.01)
USPC ............ 716/113; 716/108; 716/133; 716/134

(58) Field of Classification Search
CPC ... G06F 1/3206; G06F 1/3215; G06F 1/3246; G05D 23/1932; G01K 7/015; H03K 19/0016; H04J 3/1694
USPC .................................. 716/108, 113, 133, 134
See application file for complete search history.

(56) References Cited

U.S. PATENT DOCUMENTS

| 4,279,020 A * | 7/1981 | Christian et al. ............... 713/323 |
| 5,781,783 A * | 7/1998 | Gunther et al. ............... 713/320 |
| 7,332,956 B2 * | 2/2008 | Camara et al. ................. 327/540 |
| 8,179,111 B2 * | 5/2012 | Akyildiz et al. ............... 323/283 |
| 2008/0024173 A1 * | 1/2008 | Nagai et al. ..................... 327/20 |
| 2009/0256541 A1 * | 10/2009 | Akyildiz et al. ............... 323/283 |

* cited by examiner

*Primary Examiner* — Sun Lin
(74) *Attorney, Agent, or Firm* — Troy A. Van Aacken

(57) ABSTRACT

Devices, systems and methods of this disclosure can provide integrated circuit devices operating above their specified operating temperate. The integrated circuit device can include functional blocks with power down circuitry and functional test blocks with built in self-test capabilities (BIST). The functional blocks can be implemented with timing constraint values to provide a timing margin for the device above a specified operation temperature. The functional test blocks can be implemented with timing constraint values that result in BIST failure when the device is operated above the specified operation temperature. As the temperature of the device rises above the operating temperature the functional test blocks can fail BIST prior to loss of functionality of the functional blocks. Upon BIST failure of the functional test blocks, circuitry in the functional blocks can be powered down to facilitate continued operation of the device with reduced functionality.

20 Claims, 2 Drawing Sheets

DESIGNING INTEGRATED CIRCUITS FOR HIGH THERMAL RELIABILITY

TECHNICAL FIELD

This disclosure relates to devices, systems and methods for designing integrated circuits (IC(s)) for high thermal reliability through built in self-test.

BACKGROUND

System designers can be required to implement complex functions within constrained physical size, performance, environmental, manufacturing and cost product requirements. The circuit density available today in very large scale integration (VLSI), application specific integrated circuit (ASIC) and field programmable gate array (FPGA) integrated circuit devices can enable the implementation of complex functions by system designers while meeting the product requirements.

Integrated circuit devices can be designed and manufactured for guaranteed operation up to a maximum temperature (e.g., up to a certain junction temperature). The timing characteristics of integrated circuit devices can vary over temperature and if temperature recommendations are exceeded, unpredictable behavior of circuitry and/or logic implemented in integrated circuit devices can result.

DETAILED DESCRIPTION

The maximum temperature specified for the guaranteed operation of integrated circuit devices can be conservative. Circuitry can be added to integrated circuit devices allowing for successful operation or operation with reduced functionality above the maximum temperature. In some implementations of this disclosure, devices, systems and methods can operate to provide continued or reduced functionality of complex integration circuits operating at temperatures that exceed their guaranteed maximum operating temperature.

Integrated circuits can contain circuitry where the timing characteristics (e.g., propagation delays, setup/hold times, etc.) can vary with the temperature. As the operating temperature of an integrated circuit increases, propagation delays can become longer and setup and hold time requirements can decrease.

The design process of an integrated circuit can include the use of timing constraints. For example, a timing path including combinatorial logic between two sequential logic elements can be constrained by a clock frequency timing constraint of x MHz. The use of normal timing constraints in the design process of an integrated circuit can conservatively ensure timing paths are met resulting in the proper operation of the integrated circuit device over a guaranteed temperature operating range. Specifying a timing constraint of (x+n) MHz can over-constrain the timing path at the guaranteed maximum temperature and can provide additional timing margin at higher temperatures which can allow continued functionality of the integrated circuit device above the guaranteed maximum operating temperature.

An integrated circuit device can include primary circuitry that can be designed with over-constrained timing requirements. Additionally, secondary circuitry resembling the primary circuitry can be implemented with normal timing constraints. As result of using different timing constraints, a rise of the integrated circuit device's operating temperature can result in the failure of secondary circuitry prior to the primary circuitry.

The secondary circuitry can include built-in self-test circuitry that can be designed with normally constrained as well as over-constrained timing requirements. The built-in self-test can be periodically, routinely or continually performed. Successful built-in self-test results can indicate successful operation of the primary circuitry of the integrated circuit device at temperatures exceeding the maximum operating temperature. Failure of the built-in self-test can allow for the re-configuration of the integrated circuit device (e.g., powering down circuit elements to lower the device temperature) facilitating continued operation with reduced functionality.

Figure 1:
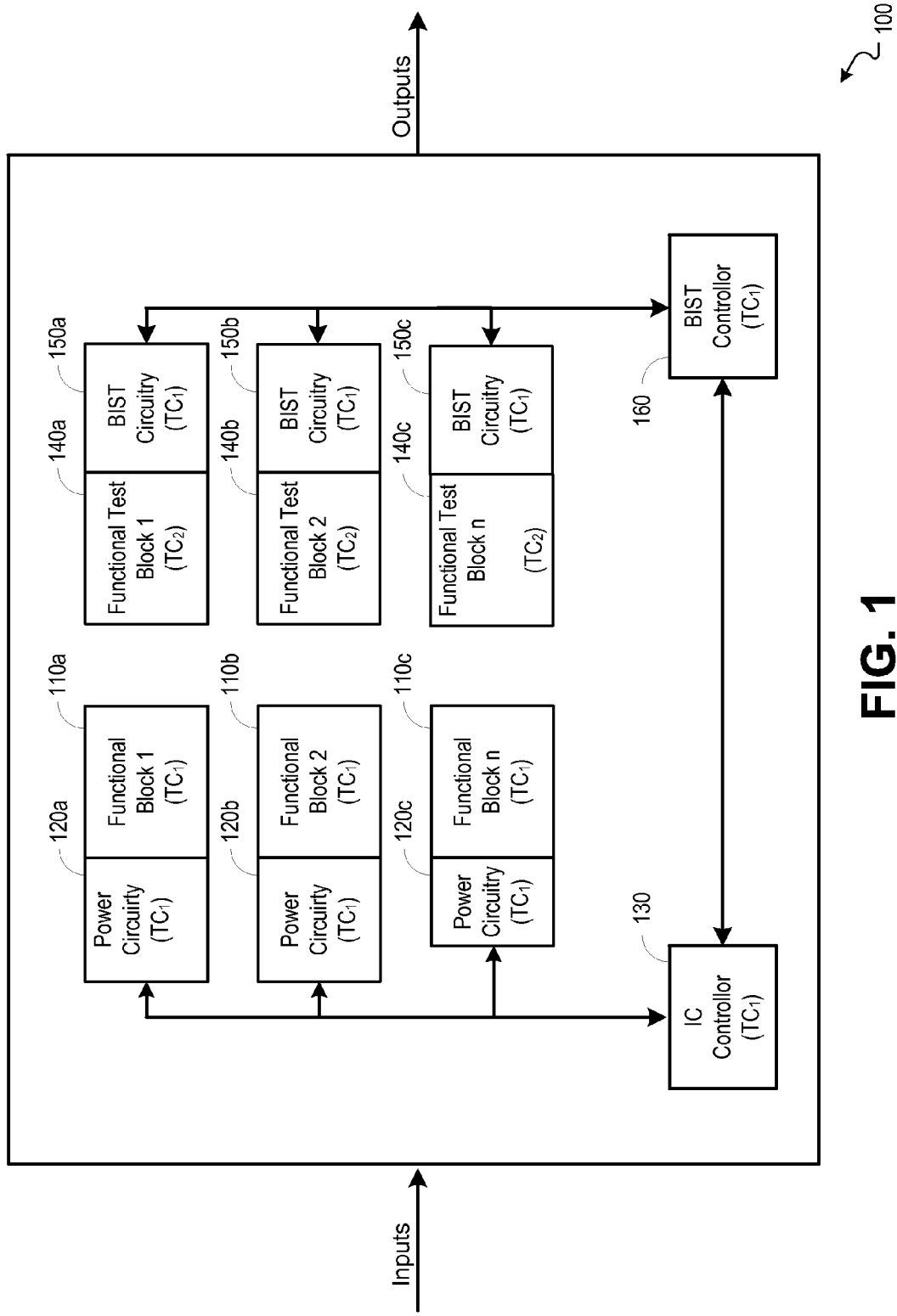
FIG. 1 is a block diagram illustrating an integrated circuit device operable to provide high thermal reliability.

FIG. 1 is a block diagram illustrating an integrated circuit device operable to provide high thermal reliability. In some implementations, integrated circuit device 100 can include functional block(s) 110a-c. Integrated circuit device 100 can receive signals through inputs and generate signals through outputs. Functional block(s) 110a-c can include circuitry comprising combinatorial/sequential logic, memory, processing functions (e.g., digital signal processor (DSP), central processing unit (CPU), etc.), analog and input/output (I/O) for receiving/generating signals internal and/or external to the integrated device 100. In some implementations, functional block(s) 110a-c can include power circuitry 120a-c that can power down the circuitry within functional block(s) 110a-c. In other implementations, the power circuitry 120a-c can power down selective circuitry in functional block(s) 110a-c. Power circuitry 120a-c can be controlled by integrated controller (IC) 130 to perform power down operations. Power down operations can reduce the operating temperature of integrated circuit device 100 and can allow for operation with reduced functionality. In some implementations, IC controller 130 can be implemented within integrated circuit device 100. In other implementations, IC controller 130 can be implemented external to the integrated circuit device 100 (not shown).

In the design process of integrated circuit device 100, functional block(s) 110a-c, power circuitry 120a-c and IC controller 130 can be specified with timing constraints of $TC_1$. Timing constraints of $TC_1$ can provide sufficient additional timing margin allowing integrated circuit device 100 to operate when the maximum operating temperature of integrated circuit 100 is exceeded.

Integrated circuit device 100 can replicate circuitry of functional block(s) 110a-c through functional test block(s) 140a-c respectively. In some implementations the functional block(s) 110a-c can be replicated in their entirety. In other implementations, a limited or partial circuitry of functional block(s) 110a-c can be replicated and can represent the circuitry of the functional block(s) 110a-c with the most stringent timing requirements. In yet other implementations, individual functional block(s) 110a-c can be replicated in-whole and/or in-part.

In some implementations, functional test block(s) 140a-c can be implemented with built in self-test (BIST) circuitry 150a-c. BIST circuitry 150a-c can validate combinatorial/sequential logic, analog, and I/O circuitry through the injection of known data at circuit input points and the comparison of the generated output against known data. BIST circuitry 150a-c can validate memory circuitry through the reading and writing of test patterns to memory during periods where the memory circuitry is not in use by the functional block(s) 110*a-c*. Processing function circuitry can be tested through performing operations with a known input that can result in a known output. In some implementations, BIST circuitry 150*a-c* operations can be initiated by IC controller 130 through communicating with BIST controller 160. BIST controller 160 can initiate BIST circuitry 150*a-c* operations in functional test block(s) 140*a-c* and provide the results of BIST operations to IC controller 130.

During the design process of integrated circuit device 100, functional test block(s) 140*a-c* can be implemented with a group of one or more timing constraint value(s) of $TC_2$. Timing constraint values $TC_2$ allow for the operation of the integrated circuit device 100 at temperatures up to the maximum operating temperature of the integrated circuit device 100. Additionally, functional block(s) 110*a-c*, power circuitry 120*a-c*, IC controller 130, BIST circuitry 150*a-c* and BIST controller 160 can be implemented with a group of one or more timing constraint value(s) of $TC_1$. Timing constraint values $TC_1$ can be more stringent than timing constraint values $TC_2$, and can provide additional timing margin for the operation of the integrated circuit device 100 at temperatures above maximum operating temperature of the integrated circuit device 100.

In some implementations, as the temperature of integrated circuit device 100 raises above the maximum operating temperature of the device, functional block(s) 110*a-c* implemented with a group of timing constraint value(s) $TC_1$ with margin can allow for the continued operation of the integrated circuit device 100. The failure of functional test block(s) 140*a-c* implemented with a group of timing constraint value(s) of $TC_2$, less stringent than $TC_1$, can allow for the powering down of circuitry in the functional block(s) 110*a-c* thereby decreasing the temperature of the integrated circuit device 100 and allowing for continued operation with reduced functionality.

Figure 2:
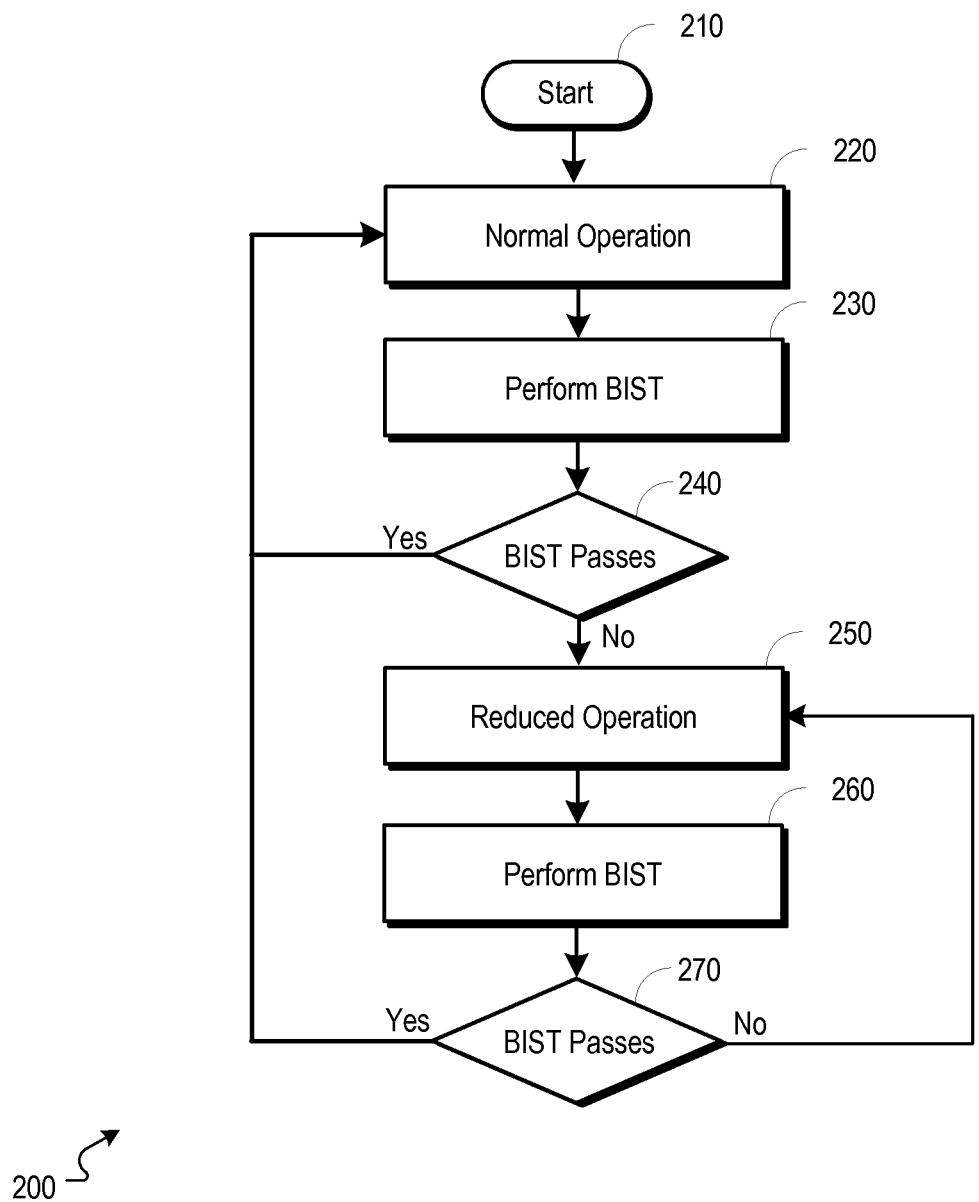
FIG. 2 is a flow chart illustrating an example process that can be used by an integrated circuit device 100 for operation in high thermal conditions.

FIG. 2 is a flow chart illustrating an example process that can be used by an integrated circuit device 100 for operation in high thermal conditions. The process 100 can start at stage 210 after the power on of an integrated circuit device (e.g., integrated circuit device 100 of FIG. 1).

At stage 220, the integrated circuit device can provide normal operations. Normal operations can include those operations that are typically performed by the device under normal operating conditions.

At state 230, BIST is performed on the functional test block(s) (e.g., functional test block(s) 140*a-c* of FIG. 1). BIST can be performed, for example, by BIST circuitry (BIST circuitry 150*a-c* of FIG. 1). In some implementations, the BIST can be initiated by the IC controller (e.g., IC controller 130 of FIG. 1) through communication with the BIST controller (e.g., BIST controller 160 of FIG. 1). The BIST controller can control the BIST circuitry of the functional test block(s) and communicate the BIST results (e.g., pass or fail) to the IC controller.

At stage 240, a determination can be made based on the BIST results. If the BIST fails, process 200 proceeds to stage 250. If the BIST passes, process 200 returns to stage 220. In some implementations, the determination can be made, for example, by the BIST controller which can communicate with the I/O controller.

At stage 250, the integrated circuit device can enter a reduced operation mode where reduced functionality is provided by the integrated circuit device. Reduced functionality can be accomplished through powering down circuitry in the functional blocks (e.g., functional blocks 110*a-c* of FIG. 1), for example, by the I/O controller communicating with the power circuitry (e.g., power circuitry 120*a-c* of FIG. 1).

At stage 260, BIST is performed on the functional test block(s). BIST can be performed, for example, by BIST circuitry. In some implementations, the BIST can be initiated by the IC controller through communication with the BIST controller. The BIST controller can control the BIST circuitry of the functional test block(s) and communicate the results (e.g., pass or fail) to the IC controller.

At stage 270, a determination can be made based on the BIST results. If the BIST fails, process 200 returns to stage 250. If the BIST passes, process 200 returns to stage 220. In some implementations, the determination can be made, for example, by the BIST controller which communicates with the I/O controller.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors (general microprocessors being transformed into special purpose microprocessor through the application of algorithms described herein), and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a phone, a cable modem, a set-top box, a mobile audio or video player, or a game console, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed:

1. An integrated circuit device, comprising:
   one or more functional block(s) comprising a first circuitry implemented with a first group of one or more timing constraint value(s), wherein the first group of timing constraint value(s) are specified for reliable operation of the integrated circuit device at a first temperature range;
   one or more functional test block(s) associated with each of the functional block(s) comprising a second circuitry implemented with a second group of one or more timing constraint value(s), wherein the second group of timing constraint value(s) are specified at value(s) for reliable operation of the integrated circuit device at a second temperature range, wherein the second temperature range is less than the first temperature range;
   a built-in self-test (BIST) circuitry implemented with the first group of timing constraint value(s) that is operable to test the one or more functional test block(s); and
   an integrated circuit (IC) controller implemented with the first group of timing constraint value(s) that is operable to initiate the BIST circuitry, wherein the IC controller is further operable to receive the BIST circuitry results.

2. The integrated circuit device of claim 1, wherein the integrated circuit device is one of a very large scale integration (VLSI) device, application specific integrated circuit (ASIC) and field programmable gate array (FPGA) device.

3. The integrated circuit device of claim 1, wherein the first circuitry comprises one or more combinatorial logic, sequential logic, memory, processing function, analog, and input/output (I/O).

4. The integrated circuit device of claim 3, wherein the processing function is a digital signal processor (DSP).

5. The integrated circuit device of claim 3, wherein the second circuitry comprises one or more of combinatorial logic, sequential logic, memory, processing function, analog, and input/output (I/O).

6. The integrated circuit device of claim 1, wherein the integrated circuit device further comprises a power circuitry operable to power down portions of the first circuitry.

7. The integrated circuit device of claim 6, wherein the IC controller controls the power circuitry.

8. The integrated circuit device of claim 1, wherein the second temperature value is a maximum operating temperature specified by a manufacturer of the integrated circuit device.

9. The integrated circuit device of claim 1, wherein the second circuitry partially replicates the first circuitry.

10. The integrated circuit device of claim 1, wherein the second circuitry represents one or more portions of the first circuitry with the most stringent time constraint value(s).

11. A computer-implemented method, comprising:
    continually testing a functional test block associated with each of one or more functional blocks within a hardware device;
    powering down a circuitry in a functional block of the hardware device on test failure of an associated functional test block; and
    powering up a circuitry in the functional block of the hardware device on test passage of the associated functional test block.

12. The method of claim 11, wherein the functional block is implemented with one or more timing constraint(s) from a first group of timing constraint value(s) and the associated functional test block is implemented with one or more timing constraint value(s) from a second group of timing constraint value(s), wherein the timing constraint value(s) of the first group are more stringent than the timing constraint value(s) of the second group.

13. The method of claim 12, wherein the one or more timing constraint value(s) from the first group of timing constraint value(s) provide a timing margin for operating the functional block above a temperature value.

14. The method of claim 13, wherein the temperature value is a maximum operating temperature specified by a manufacturer of the integrated circuit device.

15. The method of claim 11, wherein the method is performed by one of a very large scale integration (VLSI) device, application specific integrated circuit (ASIC) and field programmable gate array (FPGA) device.

16. A system, comprising:
    a circuitry organized in one or more functional block(s) implemented with a first group of one or more timing constraint value(s), wherein a controller is operable to power down selective components of the circuitry;
    one or more functional test block(s) operable to selectively replicate the circuitry implemented with a second group of one or more timing constraint value(s), wherein the second group of timing constraint value(s) are less stringent than the first group of timing constraint value(s); and
    a built-in self-test (BIST) circuitry operable to test the one or more functional test block(s), wherein the BIST circuitry is implemented with the first group of timing constraint value(s);
    wherein the BIST circuitry is further operable to communicate a BIST status to the controller, wherein the controller is implemented with the first group of timing constraint value(s); and
    wherein the controller is further operable to initiate the BIST circuitry and selectively power down the circuitry on failure of the BIST circuitry.

17. The system of claim 16, wherein the system is implemented by an integrated circuit device comprising one of, a very large scale integration (VLSI) device, application specific integrated circuit (ASIC) and field programmable gate array (FPGA) device.

18. The system of claim 17, wherein the controller is implemented external to the integrated circuit device.

19. The system of claim 17, wherein the controller powers on the circuitry after transition of the BIST status from failure to pass.

20. The system of claim 17, wherein the first group of timing constraint value(s) provide a timing margin for operation of an integrated circuit device above a guaranteed maximum operating temperature.

* * * * *